United States Patent [19]

Cooper et al.

[11] 4,365,042

[45] Dec. 21, 1982

[54] COMPOSITIONS OF POLYPHENYLENE OXIDES WITH EPDM-SILICONE RUBBER

[75] Inventors: Glenn D. Cooper; Arthur Katchman, both of Delmar, N.Y.

[73] Assignee: General Electric Company, Pittsfield, Mass.

[21] Appl. No.: 220,166

[22] Filed: Dec. 23, 1980

[51] Int. Cl.³ .............................................. C08L 83/10
[52] U.S. Cl. .................................................. 525/68
[58] Field of Search ................................. 525/68, 101

[56] References Cited

U.S. PATENT DOCUMENTS

| | | | |
|---|---|---|---|
| 3,650,810 | 3/1972 | Marzocchi | 525/68 |
| 3,737,479 | 6/1973 | Haaf | 260/9 |
| 3,836,598 | 9/1974 | Wheeler | 525/100 |
| 4,102,850 | 7/1978 | Cooper et al. | 525/68 |
| 4,152,316 | 5/1979 | Cooper et al. | 525/68 |

FOREIGN PATENT DOCUMENTS 55-73715  6/1980  Japan .................................. 525/101

*Primary Examiner*—William F. Hamrock
*Assistant Examiner*—Peter F. Kulkosky
*Attorney, Agent, or Firm*—Hedman, Casella, Gibson & Costigan

[57] ABSTRACT

There are provided novel compositions comprising blends of polyphenylene oxides with EPDM-silicone rubber, and optionally a polystyrene resin. The compositions when molded exhibit improved ductility and impact strength. Included within the disclosure are methods of preparing and molding the novel compositions and the molded products obtained therefrom.

13 Claims, No Drawings

COMPOSITIONS OF POLYPHENYLENE OXIDES WITH EPDM-SILICONE RUBBER

The invention relates to improved compositions of a polyphenylene oxide resin, an EPDM-silicone rubber, optionally containing a polystyrene resin. The compositions when molded have improved ductility and impact strength. The invention also includes methods of preparing the novel compositions, of molding articles of any desired shape therefrom, and the molded articles produced from the compositions.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al. U.S. Pat. No. 3,337,499; Blanchard et al. U.S. Pat. No. 3,219,626; Laakso et al. U.S. Pat. No. 3,342,892; Borman, U.S. Pat. No. 3,344,166; Hori et al. U.S. Pat. No. 3,384,619; Faurote et al. U.S. Pat. No. 3,440,217; and disclosures relating to metal based catalysts which do not include amines, are known from patents such as Wieden et al., U.S. Pat. No. 3,442,885 (copper-amidines); Nakashio et al., U.S. Pat. No. 3,573,257 (metal-alcoholate or -phenolate); Kobayashi et al. U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc. are described in Price et al., U.S. Pat. No. 3,382,212. Cizek, U.S. Pat. No. 3,383,435 discloses polyphenylene ether-styrene resin compositions. All of the above-mentioned disclosures are incorporated by reference.

The term "polystyrene resin" includes polymers and copolymers of styrene, alpha methyl styrene, chlorostyrene, and the like.

The term "EPDM" includes rubbery interpolymers of a mixture of mono-olefins and a polyene. Preferred types are those rubbery interpolymers of ethylene, an alpha-olefin, and a polyene. Rubbery interpolymers of ethylene, propylene, and a polyene are especially preferred.

The term "EPDM-silicone rubber" includes graft copolymers of EPDM with silicone rubber. An example of an EPDM-silicone rubber employed in the present invention is that commercially manufactured and sold by Shinetsu Chemical Industry, under the name SEP-172U.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers are improved.

Nakashio et al. U.S. Pat. No. 3,658,945 discloses that from 0.5 to 15% by weight of an EPDM-modified styrene resin may be used to upgrade the impact strength of polyethylene ether resins. In Cooper et al., U.S. Pat. No. 3,943,191 it is disclosed that when the highly unsaturated rubber used in compositions of the type disclosed by Cizek, is replaced with EPDM rubber that has a low degree of residual unsaturation, the thermal oxidative stability and color stability are improved. The EPDM rubber in the Cooper et al. compositions is comprised substantially of particles in the range of 3-8 microns.

The impact strength of the Cooper et al. compositions is superior to that of a polypropylene ether resin alone or that of similar compositions comprised of unmodified polystyrene; however, the impact strength of the Cooper et al. compositions is inferior to that of similar compositions comprised of polystyrene modified with polybutadiene rubber, such as a composition known as FG-834 available from Foster-Grant Co. As is disclosed in U.S. Pat. No. 3,981,841, the impact strength of the Cooper et al. compositions can be improved by incorporating therein impact modifiers such as an emulsion-grafted EPDM polystyrene copolymer. U.S. Pat. No. 4,152,316 incorporated herein by reference, discloses that a composition of a polyphenylene ether resin and an alkenyl aromatic resin modified with an EPDM rubber comprised of particles having a median diameter less than about two microns, preferably about 0.5 to 1.5 microns, is a very useful thermoplastic molding material having good thermal oxidative stability and good room temperature impact strength but inferior low temperature impact strength.

In U.S. Pat. No. 4,102,850 it is disclosed that the addition of small amounts of mineral oil to the polymerizing mixture of styrene and EPDM rubber produces EPDM-modified polystyrene which yields blends with polyphenylene oxide having significantly better low-temperature impact strength than blends made from EPDM-polystyrene made without the mineral oil.

In U.S. Pat. No. 3,737,479 it is disclosed that the addition of a silicone such as a polyorganosiloxane, which is fluid, to polyphenylene oxide or to polyphenylene oxide-polystyrene blends improves Gardner impact strength but not Izod impact strength (see Col. 1, lines 54-57 of U.S. Pat. No. 3,737,479).

It has now been found when small amounts of a graft copolymer of EPDM with silicone rubber is blended with a polyphenylene oxide resin, and optionally with a polystyrene resin, blends can be obtained which are substantially improved in ductility and Izod impact strength both at room temperature and at low temperatures.

DESCRIPTION OF THE INVENTION

The above-enumerated advantages are achieved with the novel high impact strength polymer compositions of the subject invention which comprise, in their broadest aspects, compositions of (a) a polyphenylene oxide (also referred to as a polyphenylene ether), (b) an EPDM-silicone rubber (also referred to as a graft copolymer of EPDM with silicone rubber or a polyorganosiloxane) and, optionally (c) a polystyrene resin.

The EPDM rubbers, that is, rubbery interpolymers comprising mixtures of mono-olefins and a polyene, with which the silicone rubber is grafted include those prepared from ethylene, an alpha-olefin, and a polyene. Preferred types comprise 10–90 mole percent of ethylene, 10–90 percent of an alpha-olefin containing 3–16 carbon atoms, and 0.1–12 mole percent of a polyene that is a non-conjugated cyclic or open-chain diene having 5–20 carbon atoms. Especially preferred are those alpha-olefins having 3–10 carbon atoms and non-conjugated cyclic or open-chain dienes having 5–10 carbon atoms.

Useful EPDM rubbers include the ethylene-propylene-ethylidene norbornene terpolymer and those described in Ritchie, Vinyl and Allied Polymer, Vol. 1, Page 121 (1968), which is incorporated herein by reference. The preferred EPDM rubbery interpolymers are those comprised of ethylene, propylene, and 5-ethylidene-2-norbornene, of ethylene, propylene, and 1,4-hexadiene; and of ethylene, propylene, and dicyclopentadiene. A preferred EPDM rubber is EPCAR 387 manufactured by the B. F. Goodrich Chemical Co.

The silicones, or the polyorgano-siloxanes, which are grafted to the EPDM rubbers are characterized by a molecular backbone of alternate atoms of silicon and oxygen, with organic groups attached to the silicon atoms. The types of organic groups, and the extent of crosslinkage between the molecules will determine whether the polyorganosiloxane will be fluids, elastomers, rubbers, or gums.

Any of the usual well-known liquid or gum-like chain stopped polyorganosiloxanes may be used in connection with this invention. Such polyorganosiloxanes may be prepared, for example by the hydrolysis of hydrolyzable aliphatic- or aromatic-substituted silanes, such as dialiphatic dihalosilanes, for example, dimethyldichlorosilane, followed by complete or partial condensation of the hydrolysis product. They may also be prepared for example by hydrolyzing mixtures of hydrolyzable diorgano-substituted silanes either among themselves or with hydrolyzable silanes containing for example, three organic radicals substituted on the silicon atom, for instance, trimethylchlorosilane.

A further method for preparing the organo-substituted polysiloxanes comprises hydrolyzing a diorgano-substituted dihalosilane, isolating the hydrolysis product and effecting reaction between the hydrolyzed product and, e.g., hexamethyl disiloxane in the presence of sulfuric acid. More specific directions for the hydrolysis of hydrolyzable organo-substituted silanes to form organo-substituted polysiloxanes may be found, for example, in patents and in the literature now available in the art.

By the term "hydrolyzable organo-substituted silanes" it is intended to mean derivatives of $SiH_4$ which contain hydrolyzable groups of radicals, for example, halogens, amino groups, alkoxy, aryloxy, acyloxy, radicals, and the like, in addition to the organic groups substituted directly on the silicon atom that are joined to the silicon through carbon-silicon linkages. Examples of such organic radicals are aliphatic radicals including alkyl radicals, for example, methyl, ethyl, propyl, isopropyl, butyl, and the like; alicyclic radicals, for example, cyclopentyl, cyclohexyl, and the like; aryl radicals, for example, phenyl, diphenyl, naphthyl, anthracyl, and the like; aralkyl radicals, for example, benzyl, phenethyl, and the like, alkaryl radicals, for example, tolyl, xylyl, and the like; heterocyclic radicals; as well as hydrolyzable silanes containing two different organic radicals, for example, methyl and phenyl radicals, and the like; attached to the silicon atom. If desired, the above-mentioned radicals may also contain substituents substituted thereon, for instance, halogens, e.g., di-, tri-, and tetrachlorophenylchlorosilanes, for example, trichlorophenyltrichlorosilane, tetrachlorophenyltrichlorosilane, and the like. The monochlorosilanes, of course, act as chain stoppers.

Hydrolysis of the above silanes or mixtures of silanes results in the formation of silanols, i.e., organo-substituted silanes containing hydroxyl groups substituted directly on the silicon, which hydroxy groups, almost immediately condense intermolecularly (intercondense) splitting out water to give the siloxane linkages mentioned previously. Such intercondensations are accelerated by acidic materials, for example, sulfuric acid, hydrochloric acid, ferric chloride, and the like, as well as by basic materials, for example, sodium hydroxide, potassium hydroxide, and the like. As a result of the hydrolysis and condensation, organo-substituted polysiloxanes may be produced which are partially or completely condensed and which may have on an average up to as high as three organic radicals substituted per silicon atom, but preferably from 1.98 to 2.25 organic groups per silicon atom.

Other directions for preparing the organopolysiloxane compositions employed in the practice of the present invention are disclosed and claimed in U.S. Pat. Nos. 2,469,888 and 2,469,890, granted to the present assignee on May 10, 1949.

Chain-stopped organopolysiloxane gums are also useful in connection with the invention. These are highly viscous masses or gummy, elastic solids depending on the state of condensation, the condensing agent employed, and the starting organopolysiloxane used to make the gummy material. A typical gummy organopolysiloxane is obtained by the condensation of a liquid organopolysiloxane containing an average of from about 1.95, preferably from about 1.98 to about 2.05 organic groups per silicon atom. The usual condensing agents which may be employed and which are well known in the art include, for instance, ferric chloride hexahydrate, phenyl phosphoryl chloride, alkaline condensing agents such as potassium hydroxide, sodium hydroxide and the like. These convertible organopolysiloxanes generally contain polymeric di-organopolysilosanes which may contain, for example, about 2 mole percent copolymerized mono-organopolysiloxane for example, copolymerized mono methylsiloxane. Generally, the starting liquid organopolysiloxane is one which contains about 1.999 to 2.01, inclusive organic groups, for example, methyl groups, per silicon atom and where more than about 90 percent, preferably 95 percent, of the silicon atoms in the polysiloxane contain two silicon-bonded alkyl groups. A typically useful gum is prepared by mixing together about 95 mole percent octamethylcycloetetrasiloxane, and about 5 mole percent octaphenyleclotetrasiloxane, at a temperature from about 150° C. to 175° C. for about 4 hours with about 0.01 percent potassium hydroxide based on the weight of the siloxane, until a highly viscous, gummy solid is obtained. Generally, the amount of octaphenylcyclotetrasiloxane can be varied up to about 20 mole percent of the total mixture for the purpose of the invention.

A preferred family of polyorganosiloxanes for use in this invention comprises those of the formula:

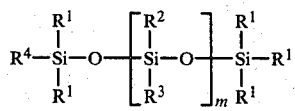

wherein $R^1$ is alkyl, haloalkyl, aryl, aralkyl, alkaryl, alkoxy, aryloxy, and halogenated derivatives of the aforesaid aryl, aralkyl, alkaryl, alkoxy or aryloxy groups. $R^2$ and $R^3$ are (lower) alkyl or phenyl, and m is an integer of such a value that the polysiloxane is a rubber at ambient temperatures, e.g., about 25° C., said rubber being of high molecular weight. $R^1$, $R^2$, and $R^3$ can also be alkenyl, for example, vinyl, allyl, or butenyl.

The (lower) alkyl groups in the polyorganosiloxanes will contain from 1 to 6 carbon atoms, straight chain and branched. Special mention is made of a preferred class of polyorganosiloxanes, which includes polymethylphenyl-siloxane polydimethylsiloxane, polydiphenylsiloxane and copolymers such as methylphenyl and dimethylpolysiloxane copolymer. Exceptionally good properties have been found with EPDM-silicones prepared from a poly dimethyl siloxane rubber and EPDM.

The polyphenylene oxides with which this invention is concerned are those having the repeating structural unit of the formula:

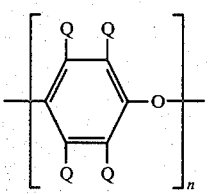

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus and being free of a tertiary alpha-carbon atom, hydrocarbonoxy radicals being free of a tertiary alpha-carbon atom, and halohydrocarbonoxy racials, having at least 2 carbon atoms between the halogen atom and phenyl nucleus and being free of a tertiary alpha-carbon atom. Examples of suitable polymers may be found in the above referenced patents of Hay.

The preferred polyphenylene oxides may be represented by the following formula:

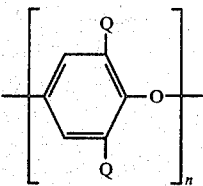

wherein Q is a monovalent substituent selected from the group consisting of hydrogen, hydrocarbon radicals free of a tertiary alpha-carbon atom, halohydrocarbon radicals having at least two carbon atoms between the halogen atom and phenyl nucleus and being free of a tertiary alpha-carbon atom, hydrocarbonoxy radicals free of a tertiary alpha-carbon atom, and halohydrocarbonoxy radicals having at least two carbon atoms between the halogen atom and phenyl nucleus and being free of a tertiary alpha-carbon atom. One but not both Q's can be halogen; and n may represent any whole integer greater than 50.

Typical examples of the monovalent hydrocarbon radicals that Q may be in the above formula are: alkyl including cycloalkyl, e.g., methyl, ethyl, propyl, butyl, secondary butyl, cyclobutyl, amyl, cyclopentyl, hexyl, cyclohexyl, methycyclohexyl, ethylclohexyl, octyl, decyl, octadecyl, etc.; alkenyl, including cycloalkenyl, e.g., vinyl, allyl, butenyl, cyclobutenyl, isopentenyl, cyclopentenyl, linolyl, etc; alkynyl, e.g., propargyl, etc; aryl, including alkaryl, e.g., phenyl tolyl, ethylphenyl, xylyl, naphthyl, methylnaphthyl, etc.; aralkyl, e.g., benzyl, phenylethyl, phenylpropyl, tolylethyl, etc. The monovalent halo hydrocarbon radicals may be the same as the hydrocarbon radicals, as outlined above, except methyl and alpha-haloalkyl radicals, wherein one or more of the hydrogen atoms are replaced by halogen, to produce halohydrocarbon radicals having at least two carbon atoms between the halogen and the free valence, examples of which are: 2-chloroethyl, 2-bromoethyl, 2-fluoroethyl, 2,2-dichloroethyl, 2- and 3-bromopropyl, 2,2-difluoro-3-iodopropyl, 2,3- , and 4-bromobutyl, 2-, 3-, 4-, and 5-fluoroamyl, 2-chlorovinyl, 2- and 3-bromoallyl, 2- and 3-fluoroparprogyl, mono-, di-, tri-, tetra and pentachlorophenyl, mono-, di-, tri- and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent hydrocarbonoxy radicals are: methoxy, ethoxy, propoxy, isopropoxy, butoxy, secondary butoxy, tertiary butoxy, amoxy, allyloxy, benzyloxy, etc., the monovalent halohydrocarbon radicals may be the same as the above oxyhydrocarbons, except methoxy and alpha-haloalkoxy radicals, where one or more of the hydrogens are replaced by a halogen, i.e., fluorine, chlorine, bromine, or iodine, to produce halohydrocarbonoxy radicals, having at least two carbon atoms between the halogen and the free valence, a few typical examples of which are 2-chloroethoxy, 2-bromoethyoxy, 2-fluoroethoxy, 2,2-dichloroethoxy, 2- and 3-bromopropoxy, 2,2-difluoro-3-chloropropoxy, 2-, 3-, and 4-iodobutoxy, 2-chlorovinoxy, and chloroethylphenoxy, ethylphenoxy, ethylchlorophenoxy, iodoxyloxy, chloroaphthoxy, chlorophenylethoxy, phenylchloroethoxy, bromotolylethoxy, etc.

Typical examples of polyphenylene oxides which may be employed in this invention are:
poly-(2,6-dimethyl-1,4-phenylene)oxide,
poly-(2,6-diethyl-1,4-phenylene)oxide,
poly-(2,6-dibutyl-1,4-phenylene)oxide,
poly-(2,6-dilauryl-1,4-phenylene)oxide,
poly-(2,6-dipropyl-1,4-phenylene)oxide,
poly-(2,6-dimethoxy, -1,4-phenylene)oxide,
poly-(2-methyl-6-phenyl-1,4-phenylene)oxide,
poly-(2-methoxy-6-ethoxy-1,4-phenylene)oxide,
poly-(2,6-di(chlorophenoxy)-1,4-phenylene)oxide,
poly-(2,6-di-(chloroethyl)-1,4-phenylene)oxide,
poly-(2-methyl-6-isobutyl-1,4-phenylene)oxide,
poly(2-6-diphenyl-phenylene)oxide, poly-(2-chloro-6-methyl-1,4-phenylene) oxide, etc.

The especially preferred polyphenylene oxides are those having alkyl groups of 1-4 carbon atoms, disubstituted ortho to the oxygen ether atom, i.e., in the formula immediately above, the Q's are each $C_1$-$C_4$ alkyl and most preferably methyl. The most preferred polyphenylene oxide is, therefore, poly(2,6-dimethyl-1,4-phenylene)oxide.

The polystyrene resin is one having at least 25 percent by weight, polymer units derived from the compound having the formula:

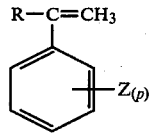

wherein R is hydrogen, (lower) alkyl of 1 to 6 carbon atoms, or halogen; Z is hydrogen, any of the halogens, (lower) alkyl of from 1 to 6 carbon atoms or vinyl and p is a whole number equal to from 0 to 5. The term "styrene resin" as used herein and in the appended claims, and defined by the above formula, includes, by way of illustration, homopolymers, such as homopolystyrene and polychlorostyrene; the modified polystyrenes, such as rubber modified high impact polystyrene, and the styrene containing copolymers, such as the styrene-acrylonitrile copolymers (SAN), styrene-butadiene copolymers, styrene-acrylonitrile alpha-alkyl styrene copolymers, styrene-acrylonitrile butadiene copolymers (ABS), poly-alpha-methylstyrene, copolymers of ethylvinylbenzene and divinylbenzene, and the like. The preferred styrene resins is a homopolystyrene such as Dylene 8G polystyrene homopolymer sold by Sinclair-Koppers Co.

The EPDM-silicone rubber can be prepared by graft polymerization of EPDM with a polyorganosiloxane or silicone mentioned above, as for example, by intimately mixing the reactants, then heating with a free radical source, for example, benzoyl peroxide or benzene bis-sulfonyl azide. The EPDM-silicone may contain up to about 50% of fumed silica.

The compositions of the subject invention can be formed, for example, by first dry mixing the components to form a premix, and then passing the premix through an extruder at an elevated temperature, for example, about 500° F. to 600° F. Extrusion has been found to be the preferred manner of blending the components according to this invention as this method has been found to give the greatest degree of homogeneity.

The amount of the EPDM-silicone rubber which may be added to the polyphenylene oxide, or the product of polyphenylene oxide with styrene resin, is that amount of EPDM-silicone rubber which does not cause grass lamination in the molded product. In general, it has been found that there can be incorporated up to about 15% by weight of EPDM-silicone rubber, the preferred range being from about 3% to about 12% of EPDM-silicone rubber in the compositions.

It has been found that the polyphenylene oxides and the styrene resins are combinable with each other in all proportions. Consequently, compositions comprising from about 1 to about 15 percent by weight of EPDM-silicone rubber from 1 to 99.9 percent by weight of polyphenylene ether and from 0 to 98 percent by weight styrene resin are included within the scope of this invention. In general, compositions containing from about 1 to about 15 percent of EPDM-silicone rubber, from about 30 to about 99% percent of polyphenylene oxide and from 0 to about 70 percent styrene resin exhibit the best properties and these compositions are preferred. Also, the compositions can contain up to 30 percent of triarylphosphate, for example, triphenyl phosphate, to improve processability and flame resistance.

DESCRIPTION OF THE PREFERRED EMBODIMENTS

The following examples are set forth as further illustration of the invention and are not to be construed as limiting the invention thereto. The parts are by weight.

EXAMPLE I 5 parts of SEP-1720 (an EPDM-silicone rubber manufactured and sold by Shinetsu Chemical Industry), 78 parts of poly(2,6-dimethyl, -1,4-phenylene)oxide having an intrinsic viscosity of 0.47 dl./g. in chloroform at 30° C., 22 parts of triphenyl phosphate, 0.5 parts of diphenyl decyl phosphite, 0.15 parts of zinc sulfide, and 0.15 parts of zinc oxide were mixed together and blended by extrusion in a Brabender single-screw extruder, and molded into standard test bars in a one ounce screw injection molding machine, at 520° F.

A control blend of the same composition, but without the EPDM-silicone rubber, was extruded and molded in the same way. The control blend had a notched Izod impact strength of 0.9 foot lbs/inch of notch at 73° F., 0.6 foot lbs./inch, at −40° F., tensile elongation of 77 percent, and a heat distortion temperature of 213° F. The composition containing EPDM-silicone rubber had an Izod impact strength of 1.8 foot lbs/inch at 73° F., 1.0 foot lbs/inch at −40° F., tensile elongation of 93 percent, and heat distortion temperature of 202° F.

EXAMPLE II 10 parts of SEP-1720 EPDM-silicone rubber, 50 parts of poly-(2-6-dimethyl-1,4-phenylene) oxide having an intrinsic viscosity of 0.46 dl./g. in chloroform at 30° C., 50 parts of Dylene 8G (a polystyrene homopolymer manufactured by Sinclair-Koppers Company), 3 parts of triphenyl phosphate, 1 part of diphenyl decyl phosphite, 0.15 parts of zinc sulfide and 0.15 parts of zinc oxide were mixed and extruded and molded as described in Example 1, together with a control blend of the same composition but without the EPDM-silicone rubber. The control had notched Izod impact strength of 0.7 foot lbs/inch of notch at 73° F., 0.6 foot lbs. at −40° F., tensile elongation of 17 percent and heat distortion temperature of 240° F. The composition containing the EPDM silicone rubber had an Izod impact strength of 1.8 foot lbs/inch at 73° F., 1.0 foot lbs. at −40° F., tensile elongation of 51 percent and heat distortion temperature 236° F.

For the poly(2,6-dimethyl-1,4-phenylene) oxide, in the above examples, there may be substituted, respectively, equal weights of the following:
poly(2-methyl-6-ethyl-1,4-phenylene)oxide;
poly(2-methyl-6-propyl-1,4-phenylene)oxide;
poly(2,6-dipropyl-1,4-phenylene)oxide;
poly(2-ethyl-6-propyl-1,4-phenylene)oxide;
poly(2,6-diauryl-1,4-phenylene)oxide;
poly(2-methyl-6-benzyl-1,4-phenylene)oxide;
poly(2,6-dimethoxy-1,4-phenylene)oxide;
poly(2,3,6-trimethyl-1-4-phenylene)oxide;
poly(2,6-diethoxy-1,4-phenylene)oxide;

poly(2-methoxy-6-ethoxy-1,4-phenylene)oxide;
poly(2-ethyl-5-stearyloxy-1,4-phenylene)oxide;
poly(2,6-dichloro-1,4-phenylene)oxide;
poly(2,3-dimethyl-5-chloro, 1,4-phenylene)oxide;
poly(2-methyl-6-phenyl-1,4-phenylene)oxide;
poly(2,6-dibenzyl-1,4-phenylene)oxide;
poly(3-chloro-1,4-phenylene)oxide;
poly(3,5-diethyl-1,4-phenylene)oxide;
poly(3-ethoxy-1,4-phenylene)oxide;
poly(2-chloro-1,4-phenylene)oxide; and
poly(2,5-dibromo-1,4-phenylene)oxide.

Because of their excellent physical, mechanical, chemical, electrical and thermal properties, the polymer products of this invention have many and varied uses. For example, they can be used in molding powder formulations, either alone or mixed with other polymers and may contain various fillers, as well as reinforcements to make molded parts. They can also be used to prepared molded, or extruded articles, films, tapes and the like. The subject polymers may also be mixed with various fillers, modifying agents, etc. such as dyes, pigments, stabilizers, plasticizers, etc.

The above mentioned patents and/or publications are incorporated herein by reference. Obviously, other modifications and variations of the present invention are possible, in the light of the above teachings. It is, therefore, to be understood that changes may be made in the particular embodiments of the invention described which are within the full intended scope of the invention as defined by the appended claims.

We claim:
1. A composition comprising:
   (a) from about 1 to about 15 percent of a graft copolymer of a rubber interpolymer of a mixture of mono-olefins and a polyene with a silicone rubber;
   (b) from about 30 to about 99 percent by weight of a polyphenylene oxide resin; and
   (c) from 0 to about 70 percent by weight of a styrene resin having at least 25% polymer units derived from the compound having the formula:

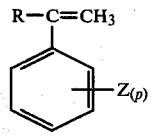

wherein
R is hydrogen, (lower) alkyl or halogen,
Z is hydrogen, halogen, (lower) alkyl or vinyl, and
p is a whole integer from 1 to 5.

2. The composition of claim 1, wherein the rubber interpolymer is an interpolymer of ethylene, an alpha-olefin and a polyene.
3. The composition of claim 2 wherein the alpha-olefin is propylene.
4. The composition of claim 1, wherein the silicone rubber is a polyorganosiloxane of the formula:

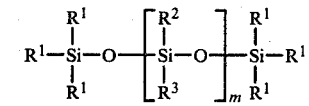

wherein $R^1$ is alkyl, haloalky, aryl, aralkyl, alkaryl, alkoxy, aryloxy and halogenated derivatives of the aforesaid aryl, aralkyl, alkaryl, alkoxy or aryloxy groups; or alkenyl; $R_2$ and $R_3$ are (lower) alkyl, alkenyl, or phenyl; and m is an integer of such value that the polysiloxane is a rubber at ambient temperature.

5. The composition of claim 1 wherein the polyphenylene oxide is of the formula:

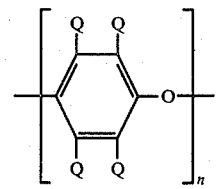

wherein the oxygen ether atom of one unit is connected to the benzene nucleus of the next repeating unit, n is a positive integer and is at least 50, and each Q is a monovalent substituent selected from hydrogen, halogen, hydrocarbon radicals being free of a tertiary alpha-carbon atom, halohydrocarbon radicals having at least two carbon atoms between the halogen atom and phenyl nucleus and being free of a tertiary alpha-carbon, atom, hydrocarbonoxy radicals being free of a tertiary alpha-carbon atom and halohydrocarbonoxy radicals having at least 2 carbon atoms between the halogen atom and phenyl nucleus and being free of a tertiary alpha-carbon atom.

6. The composition of claim 5, wherein the polyphenylene oxide is poly-(2,6-dimethyl-1,4-phenylene)oxide.
7. The composition of claim 1 wherein the styrene resin is a homopolystyrene.
8. The composition which comprises:
   (a) from about 1 to about 15 percent of a graft comp-polymer of a rubber interpolymer of a mixture of ethylene, propylene and a polyene with a silicone rubber,
   (b) from about 30 to about 90 percent of poly-(2,6-dimethyl-1,4-phenylene)oxide, and
   (c) from 0 to about 70 percent of a homopolystyrene.
9. The composition of claim 1, which contains up to about 30% of a triaryl phosphate.
10. A molded composition having improved notched Izod impact strength and ductility obtained by molding the composition of claim 1.
11. A molded composition having improved notched Izod impact strength and ductility obtained by molding the composition of claim 8.
12. A process for preparing the composition of claim 1, which comprises mixing components (a), (b), and (c) and blending the mixture by extrusion.
13. A process according to claim 12, wherein the blended product is molded into any desired shape.

* * * * *